Dec. 6, 1966    O. S. CHAMBERS    3,289,681
DENTAL FLOSS HOLDER
Filed April 8, 1964
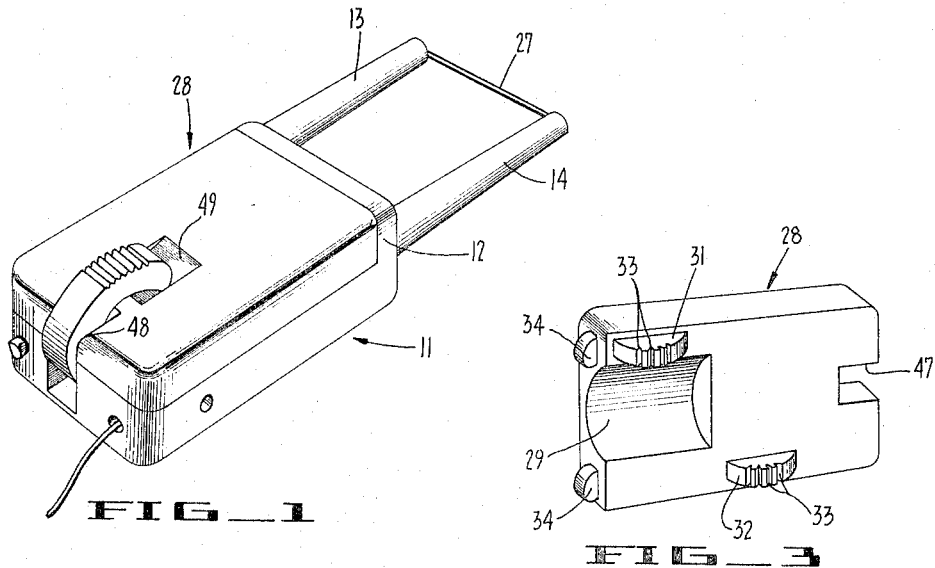
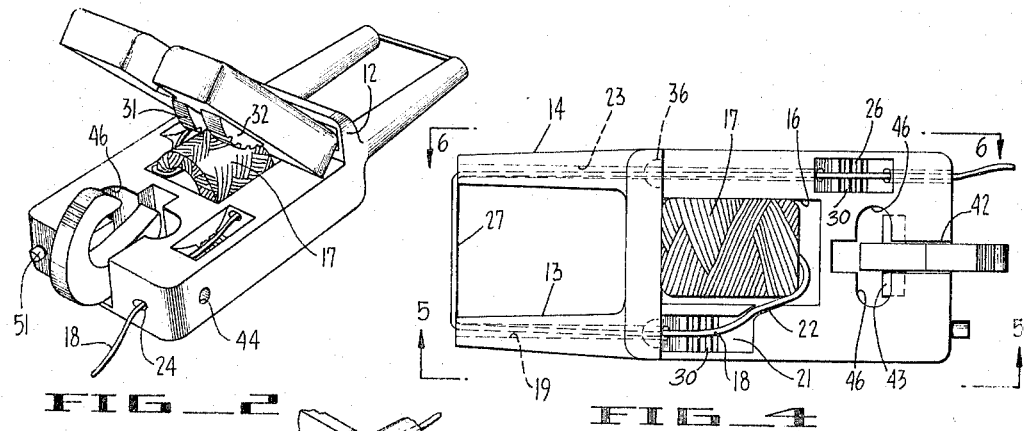
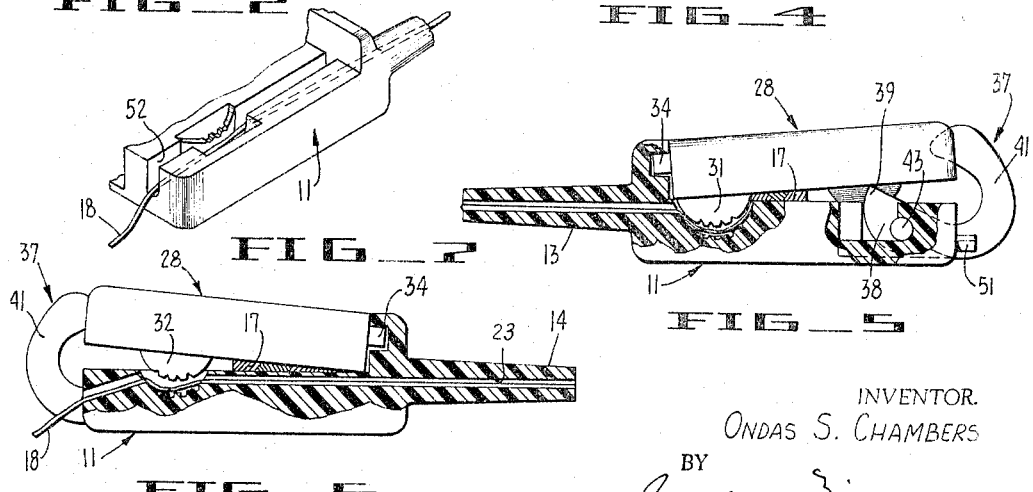
INVENTOR.
ONDAS S. CHAMBERS
BY
Gardner & Zimmerman
ATTORNEYS

United States Patent Office 3,289,681
Patented Dec. 6, 1966

3,289,681
DENTAL FLOSS HOLDER
Ondas S. Chambers, 1530 Court St., Alameda, Calif.
Filed Apr. 8, 1964, Ser. No. 358,194
7 Claims. (Cl. 132—92)

The present invention relates generally to dental floss holders of the type whereby a strand of floss may be held taut and inserted and manipulated between the teeth of a user, and is more particularly directed to a device of this class which is characterized by its simplicity of construction and ease of manipulation in the advancement of fresh sections of floss to an operable position.

Various dental floss holders have been provided heretofore for holding a section of a strand of floss taut in an operable position wherein the section of floss may be readily manipulated between the teeth of a user. These holders have been further arranged such that fresh sections of the strand of floss may be advanced into taut operable position. Typically, however, the mechanisms for advancing fresh sections of the strand and rendering same taut have been relatively complex and cumbersome to manipulate.

Accordingly, it is an object of the present invention to provide a dental floss holder of relatively simple design which may yet be easily manipulated to advance fresh sections of a strand of floss to an operable position and to render these fresh sections taut in such position.

Another object of the invention is the provision of a floss holder of the class described which is capable of holding a relatively ample supply of dental floss.

Still another object of the invention is to provide a dental floss holder which may be formed entirely of plastic in a simple readily moldable three piece construction.

It is a further object of the invention to provide a dental floss holder of the class described having cutter means by which the used sections of floss may be readily cut from the remainder of the strand.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a perspective view of a dental floss holder in accordance with the invention, the cover of the holder being closed to maintain a section of a strand of floss taut in an operable position.

FIGURE 2 is a perspective view of the holder similar to that of FIGURE 1, but with the cover in an open position to illustrate interior details of the body of the holder.

FIGURE 3 is a perspective view of the cover of the holder oriented to illustrate details of its interior construction.

FIGURE 4 is a plan view of the holder with the cover removed.

FIGURE 5 is an elevation view of one side of the holder with portions broken away, the cover of the holder being in a partially open position wherein the strand of floss is released for advancement of a fresh section thereof to operable position.

FIGURE 6 is an elevation view with portions broken away of the opposite side of the holder from that illustrated in FIGURE 5, the cover of the holder being again in partially open position.

FIGURE 7 illustrates a modification of the holder.

Considering now the invention in some detail and referring to the illustrated form thereof in the drawing, there will be seen to be provided a dental floss holder which generally includes a body from one end of which a pair of parallel spaced apart prongs project. The body is provided with a receptacle for receiving a coil, spool, or other supply of dental floss. In addition, a guide path for the strand of floss is provided in the body, and this path extends from the receptacle through one prong and through the second prong to an outlet from the body preferably at the opposite end thereof from the prongs. The strand of floss from a supply thereof in the receptacle may hence be threaded along the guide path through the first prong, across the gap between the prongs, and through the second prong to the outlet. By pulling the strand from the first prong, and taking up the slack by pulling on the free end of the strand extending from the outlet, fresh sections of the strand are advanced to the position bridging the gap between the prongs. A section of the strand bridging the gap may be readily manipulated between adjacent teeth of a user if this section is maintained taut. To maintain the desired tautness of an operably positioned section of the strand, means are provided for selectively retentively clamping the strand at points of the guide path which are respectively disposed between the receptacle and free end of the first prong, and between the free end of the second prong and the outlet. In accordance with the particularly important aspects of the invention the clamping means are simply, yet effectively provided by complementary engaging means of the body and a cover which is arranged to be clampingly engageable with the body. The complementary engaging means intercept the strand path at the aforementioned positions, and hence when the cover is clampingly engaged with the body, retain the strand taut across the gap between the prongs. The holder further includes latch means of unique design arranged in one position to clamp the cover to the body, and in another position to release the cover and tilt same slightly upward relative to the body to thereby disengage the complementary engaging means. Thus in the second position of the latch means, the strand is released and may be advanced to position a fresh section of strand across the gap between the prongs. Upon manipulation of the latch means to its first position, the cover is clampingly engaged with the body and the strand is clamped by the complementary engaging means to thereby maintain the fresh section taut.

Considering now the dental floss holder in greater detail as to preferred structure and referring to FIGURES 1 and 2 in particular, the body of the holder will be seen to be designated by the numeral 11. The body is of generally rectangular form and provided with an upwardly stepped transverse head portion 12 at one end Prongs 13, 14 project longitudinally from the head portion adjacent the opposite sides thereof in parallel transversely spaced relation. A recess 16 is provided in the flat upper face of the body adjacent the head portion 12, and such recess is preferably semicircular in transverse cross section. The recess defines the previously mentioned receptacle for receiving a supply of dental floss. In this regard the supply of floss may be in the form of a coil 17, cartridge, or the like which is readily received by the recess. Preferably the coil, etc., is of the type which unravels from the center, rather than from the periphery.

As will be best seen from FIGURE 4, the guide path for the strand 18 of the coil 17 will be seen to preferably include a bore 19 extending coaxially through the prong 13 from an arcuate recess 21 formed in the upper face of the body adjacent one side of recess 16 in parallel relation thereto. The recess 21 extends to the upwardly stepped head portion 12 to thereat communicate with the bore 19. In addition, a channel 22 connects the recess 16 to the opposite end of recess 21 from that communicating with the bore 19. The guide path further includes a bore 23 which extends coaxially through the prong 14 and longitudinally through the remainder of the body to terminate in an opening 24 at the opposite end thereof from the prongs. The opening 24 defines the previously mentioned outlet for the used portion of the strand of dental floss. A second annular recess 26 is formed in the upper face of the body in intercepting relation to the bore 23, and such recess is preferably longitudinally offset from recess 21. The strand 18 is led from the coil 17 through the channel 22 and recess 21 into the bore 19. The strand is then led from the bore 19 at the free end of prong 13 and across the gap between the prongs into the bore 23 at the free end of prong 14. Finally, the strand is led through bore 23 and out of opening 24, the strand extending through recess 26 in transit. The section 27 of the strand which bridges the prongs constitutes the operably positioned section of strand to be manipulated between the teeth of a user. In addition, the recesses 21, 26 are preferably provided with grooves 30 and comprise the body portions of the complementary engaging means for clamping the strand in taut position, as will be described in greater detail hereinafter.

The cover 28 of the holder, as best shown in FIGURE 3, is of flat substantially rectangular configuration. Such cover is arranged to be complementary to the body such that when the cover is positioned upon the upper face thereof in end abutment with upwardly stepped head portion 12, the upper face of the cover is flush with the upper surface of the head portion. The lower face of the cover is provided with a recess 29 extending inwardly from one end and having a semicircular transverse cross section. The recess 29 is opposed to the body recess 16 when the cover is positioned upon the body and serves to receive the upper protruding portion of the coil 17 of floss. The lower face of the cover is further formed with longitudinally offset arcuate ears 31, 32 adjacent the opposite sides of the cover. These ears engage the body recesses 21, 26 when the cover is positioned upon the body and comprise the cover portions of the complementary strand engaging means. The lower extremities of the ears are preferably formed with grooves 33, or are otherwise roughened so as to cooperate with the similarly roughened surfaces of the recesses and firmly grip the strand of floss extending through the recesses. To facilitate securance of the cover to the body, the forward end of the cover is preferably formed with a pair of detents 34 for engaging a pair of relatively enlarged recess 36 formed in the stepped face of body head portion 12. With the detents 34 engaging the recesses 36, the cover is in substantially hinged relationship to the body and may be pivoted to a slightly tilted position relative to the upper face of the body. Of course, when the cover is in such tilted position, the ears 31, 32 are partially disengaged from the recesses 21, 26 such that the strand of floss is freed for movement therethrough. When the cover is not tilted, but clamped against the upper face of the body, the ears tightly engage the recesses and thereby retentively grip the strand to hold the section 27 thereof taut.

Considering now the latch means for slectively clamping the cover upon the body or tilting the cover from the body, such latch means preferably includes a latch hook 37, as best shown in Figure 5. The hook 37 includes a base portion 38 the upper edge of which is substantially linear, and the lower edge of which is arcuate. The upper and lower edges of the base portion 38 intersect in a point 39. The hook further includes an open loop portion 41 which extends arcuately and reentrantly from the base portion. The interior edge of the open loop portion is substantially liear at its end and substantially parallel to the upper edge of base portion 38. The interior edge of the open loop portion is then arcuate between its linear end termination and the upper edge of the base portion. The latch hook is disposed in a slot 42 formed in the upper face of the body 11 and extending thereinto from the rearward end of the body. The hook, as so positioned, is mounted for rotation about a transverse axis. In this regard, the hook is preferably formed with pins 43 projecting from the opposite sides of base portion 38. A transverse bore 44 extends through the body and intersects the slot 42. The slot includes side wings 46 which communicate radially with the bore. The hook may thus be placed in the slot 42 with the pins 43 being accommodated by the side wings 46. The hook may then be moved longitudunally rearward to engage the pins in bore 44 and therby rotatably mount the hook.

With the rotatable latch hook 37 thus provided, the cover 28 is formed with a notch 47 in its rearward end, such notch overlying the end portion of slot 42. The outer end 48 of the notch is preferably curved to substantially conform to the arcuate section of the interior edge of the open loop portion 41 of the hook. In addition the upper face of the cover is preferably formed with a depression 49 slightly forwardly displaced from the notch 47 which is adapted to receive the linear end termination of the interior edge of the open loop portion. Thus, with the hook in a first position wherein the linear upper edge of the base portion 38 is substantially horizontal and disposed beneath the upper face of the body, the arcuate section and linear end termination of the interior edge of open loop portion 41 respectively engage the end 48 of notch 47 and the depression 49. The hook at this time tightly clamps the cover to the body. Now, if the hook is rotated in a direction to disengage the interior edge of its open loop portion from the cover, the point 39 of its base portion is simultaneously elevated above the upper face of the body as best shown in FIGURE 5. The point hence urges the cover slightly upward to the previously mentioned tilted position wherein the strand of floss is freed for advancement.

The holder of the present invention preferably further includes a pin 51 having a sharpened edge, or equivalent cut-off means, by which the used sections of the strand of floss may be severed from the remainder thereof. The pin is best disposed at the rear end of the body on the opposite side thereof from the opening 24. Thus the used portion of the strand emanating from the opening may be drawn across the pin to thus cut off the portion of strand. Yet a sufficient length of the strand extends from the opening that the strand may be grasped between the fingers.

In the over-all operation of the dental floss holder, the cover 28 is removed from the body 11 and the coil 17 of floss is placed in recess 16. The strand 18 of floss is led along the previously mentioned guide path and the section 27 of the strand bridges the prongs 13, 14, while the free end of the strand extends from the opening 24. The cover is then positioned upon the body and the free end of the strand is pulled to render the section 27 to taut. The latch hook 41 is now rotated into engagement with the cover to clamp same tightly to the body. The ears 31, 32 at this time tightly engage the recesses 21, 26 and clamp the strand in taut position. The holder may now be used to manipulate the section 27 of the strand between the teeth. After use, the latch hook is disengaged from the cover and the point 39 of the base portion of the hook urges the cover upwardly to a slightly tilted position. The strand is now free, and a fresh section 27 thereof may be pulled from prong 13 while the slack is taken up by pulling on the free end of the strand emanating from opening 24. The latch hook is then again engaged with the cover and the holder is ready for use. Periodically, the used portion of the strand extending from opening 24 is severed from the remainder of the strand by pulling same across the cut-off pin 51.

It is of importance to note that the floss holder provided in the manner described above includes but three components, namely the body 11, cover 28, and latch hook 37. The configuration of each of these elements is such that same is readily moldable from plastic and the elements may be directly assembled without requirement of additional parts. Some advantages in the molding of the body accrue where the configuration of the body is slightly modified as indicated in FIGURE 7. In this regard the portion of the bore 23 extending beneath the flat upper face of the body rearwardly of the head portion 12 is replaced by a groove 52.

What is claimed is:

1. A dental floss holder comprising a body having a pair of spaced apart prongs projecting from an end thereof, said body having a recess in an upper face thereof for receiving a supply of dental floss and a guide path for the strand of the floss supply including a section extending from said recess through one prong and a second section extending through the other prong, said second section extending rearwardly of the body to an exterior outlet, said strand of floss as extended along said guide path bridging the gap between said prongs, a cover disposed upon said upper face of said body, means including complementary engaging portions of said cover and body intercepting said first and second sections of said guide path for gripping said strand extending therealong, and latch means for selectively clampingly engaging said cover with said body.

2. A dental floss holder according to claim 1, further defined by said latch means comprising a latch hook rotatably mounted in said body and having an open loop portion for engaging said cover, said hook rotatable between a first position wherein said open loop portion engages said cover and a second position wherein said open loop portion is disengaged from said cover, said hook having a base portion which is recessed beneath said upper face of said body in said first position of said hook and extended above said upper face in said second position of said hook to thereby engage said cover and urge same upwardly to disengage said complementary portions of said cover and body.

3. A dental floss holder comprising a generally rectangular body having an upwardly stepped head portion at one end with a pair of spaced apart prongs projecting therefrom, said body having a flat upper face rearwardly of said head portion, said face having a recess adjacent said head portion for receiving a coil of dental floss, said body having a guide path for the strand of floss of said coil, said path including a first section extending from said recess through one of said prongs and a second section extending through the other of said prongs longitudinally rearwardly of said upper face, said strand of floss as extended along said guide path bridging the gap between said prongs, a cover disposed upon said upper face and pivotally secured to said head portion, means including complementary engaging portions of said body and cover intercepting said first and second sections of said guide path for gripping said strand between said complementary portions, and a latch hook rotatably mounted in said body adjacent the rearward end of said upper face, said hook including a base portion and an open loop portion, said hook having a first position wherein said open loop portion engages said cover adjacent its rear edge and the base portion is recessed beneath the level of said upper face, said hook having a second position wherein said open loop portion is disengaged from said cover and said base portion is elevated relative to said upper face, said base portion in said second position engaging said cover to pivot same upwardly and disengage said complementary engaging portions of said body and cover.

4. A dental floss holder according to claim 3, further defined by said complementary engaging portions of said body and cover comprising generally arcuate recesses in said upper face of said body intercepting said first and second sections of said guide path and ears projecting from the lower face of said cover and engageable with said arcuate recesses.

5. A dental floss holder according to claim 4, wherein the lower surfaces of said arcuate recesses and ears are grooved.

6. A dental floss holder comprising a generally rectangular body having a head portion at one end upwardly stepped from a flat upper face, said head portion having a pair of spaced apart prongs projecting therefrom, said flat upper face having a recess centrally adjacent said head portion for receiving a coil of dental floss, said body having a guide path for the strand of floss of said coil, said path including a first section defined by a bore through one of said prongs terminating in an arcuate recess in said upper face adjacent said head portion and communicating with said coil receiving recess, said path including a second section defined by a bore extending through the second of said prongs and longitudinally through said body to the rear end thereof with a second arcuate recess intercepting the bore adjacent said rear end, said body having a transverse bore extending therethrough adjacent said rear end and a slot in said upper face extending longitudinally forward from said rear end and intercepting said transverse bore, said slot having opposed lateral side wings in radical communication with said transverse bore, a cover disposed upon said upper face and having a pair of transversely spaced detends projecting from its forward end engaged in a pair of relatively enlarged recesses in the stepped face of said head portion, said cover having a pair of ears projecting from its lower face engaging said arcuate recesses, said cover having a notch in its rear end overlying the end portion of said slot, and a latch hook having a base portion with an open loop portion extending therefrom, said base portion having a substantially flat upper edge and said open loop portion having an inner edge including a substantially flat end section in parallel spaced relation to said upper edge of said base portion and an arcuate section connecting said end section and upper edge of said base portion, said hook having pins projecting laterally from the opposite sides of said base portion, said pins insertable through said side wings and engaged in said transverse bore with the base portion being disposed in said slot, said hook being thereby rotatable between a first position wherein said flat end section and arcuate section of said inner edge of the open loop portion respectively engage the upper face of said cover and the end of said notch while the upper edge of said base portion is below the level of said upper face and a second position wherein said inner edge of said open loop portion is disengaged from said cover while the upper edge of said base portion engages said cover to pivot same upwardly.

7. A dental floss holder according to claim 6, wherein said second section of said guide path is defined by a bore extending through the second of said prongs and a groove in said upper face communicating with the bore through said second prong and extending longitudinally to the rear end of said body with a second arcuate recess intercepting said groove.

References Cited by the Examiner

UNITED STATES PATENTS

| 911,068 | 2/1909 | Perkins | 132—92 |
| 1,217,779 | 2/1917 | Kleckner | 132—92.1 |
| 2,187,442 | 1/1940 | Beach | 132—92 |
| 2,544,276 | 3/1951 | Ness | 132—92 |

RICHARD A. GAUDET, *Primary Examiner.*

R. L. FRINKS, *Assistant Examiner.*